Aug. 25, 1931.  J. M. CALKINS  1,820,117
DIRIGIBLE HEADLIGHT
Filed Aug. 19, 1929  2 Sheets-Sheet 1
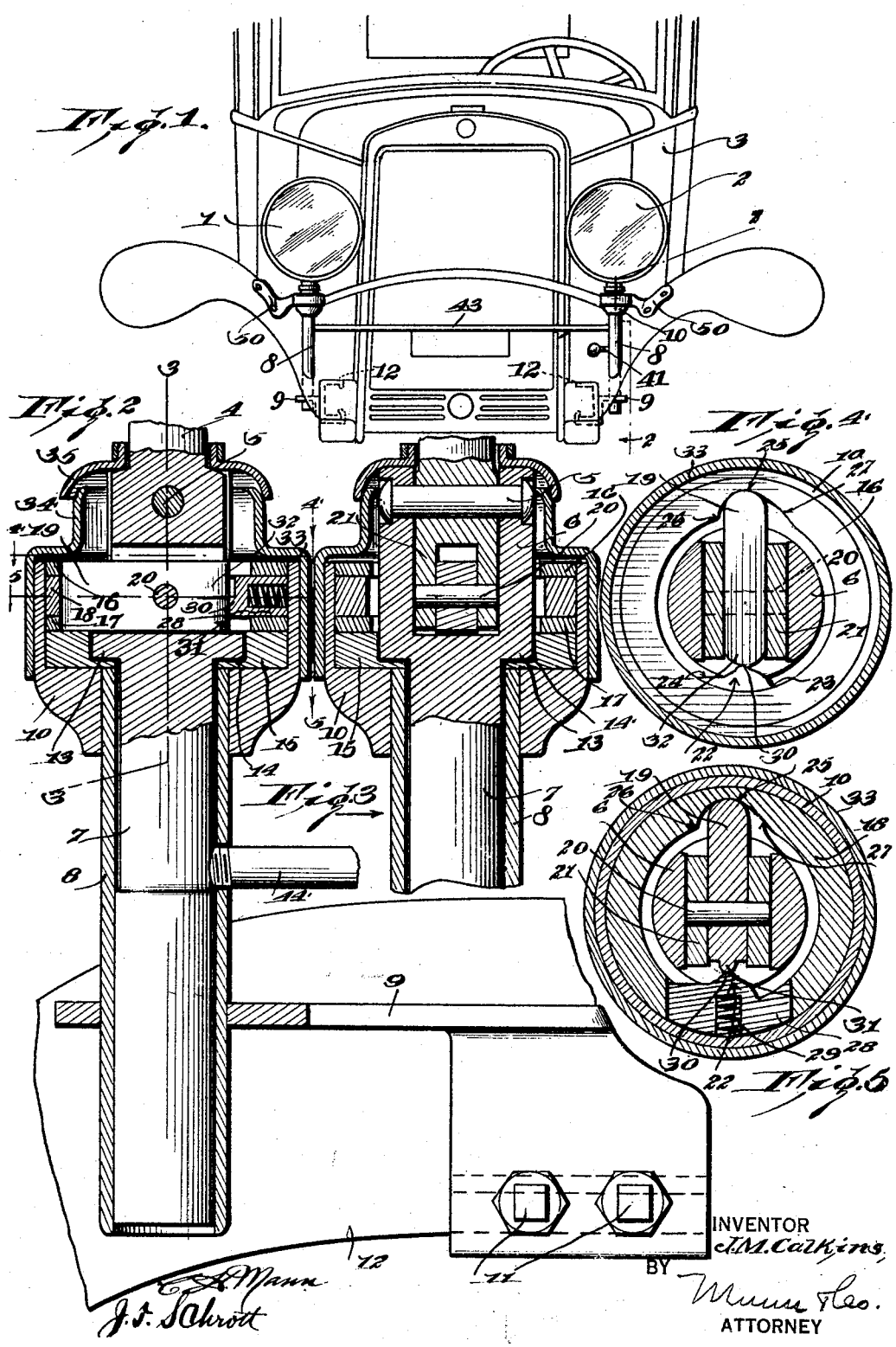
INVENTOR
J.M. Calkins
BY
ATTORNEY Aug. 25, 1931.    J. M. CALKINS    1,820,117
DIRIGIBLE HEADLIGHT
Filed Aug. 19, 1929    2 Sheets-Sheet 2
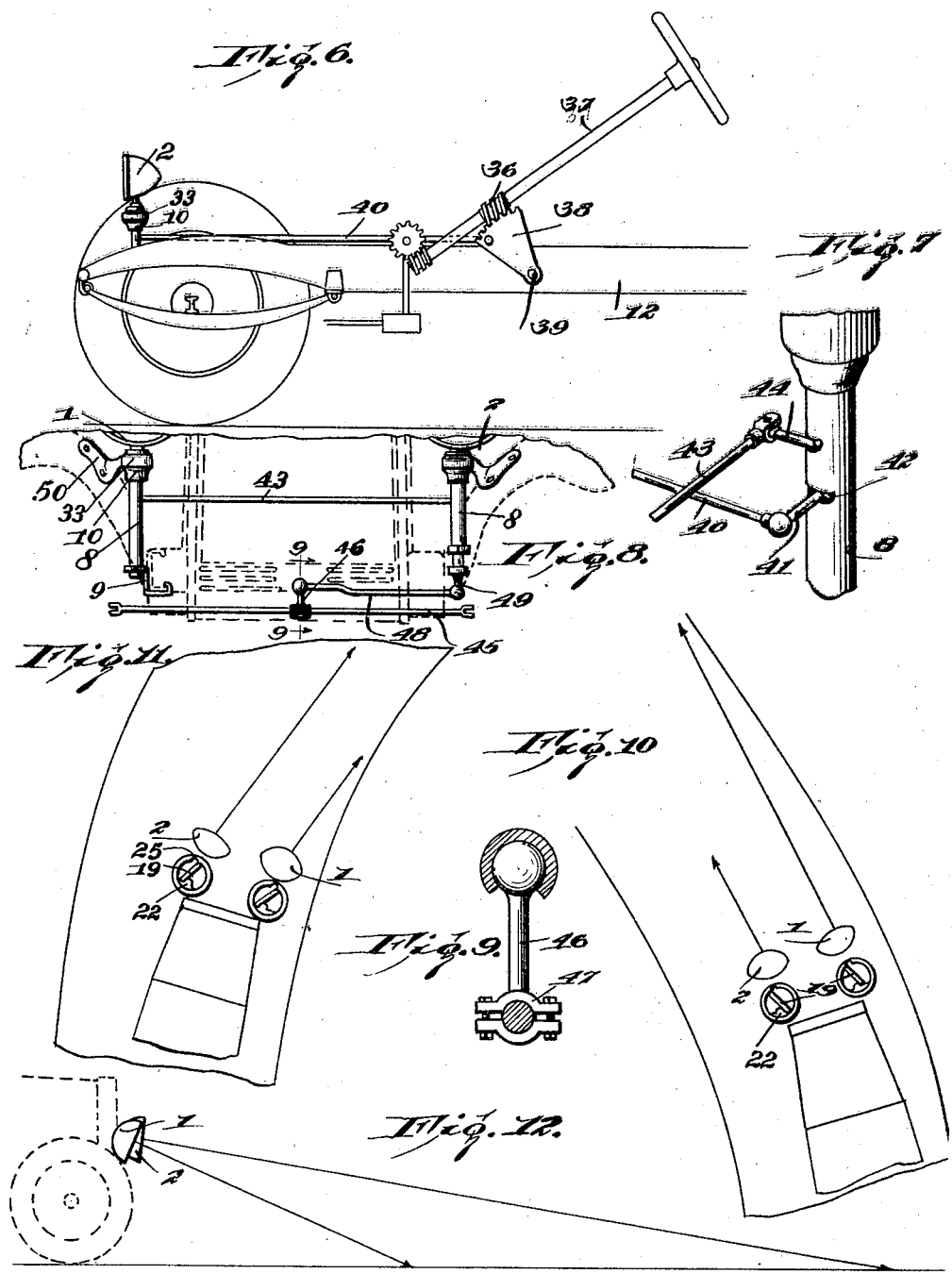

Patented Aug. 25, 1931

1,820,117

UNITED STATES PATENT OFFICE

JAMES M. CALKINS, OF MIAMI, FLORIDA

DIRIGIBLE HEADLIGHT

Application filed August 19, 1929. Serial No. 387,065.

This invention relates to improvements in dirigible headlights for vehicles and it consists of the constructions, combinations and arrangements herein described and claimed.

Another object of the invention is to provide dirigible headlights especially for motor vehicles, with the attributes of respectively illuminating the near shoulder and farther reaches of the road when travelling around a curve so that not only will the farther portions of the road be illuminated, but what is more important to the driver, the adjacent shoulder will also be illuminated, thus enabling the driver to pursue his course even in the face of the glare of the oncoming headlights of a vehicle rounding the curve in the other direction.

Another object of the invention is to equip each headlight with a cam mechanism, these mechanisms being arranged to cause the headlight nearest to the inside of the curve to drop more than the one inside of the road so that both the adjacent shoulder and the farther reaches of the road will be illuminated in rounding a curve in a particular direction.

Another object of the invention is to provide for slightly dropping both headlights simultaneously upon slightly turning the vehicle in one direction or the other, so as to avoid dazzling the eyes of an approaching driver with headlight glare.

Other objects and advantages will appear in the following specification, reference being had to the accompanying drawings, in which:—

Figure 1 is a front elevation of a portion of a motor vehicle showing the improved headlights applied;

Figure 2 is a vertical section taken on the line 2—2 of Figure 1, parts being in elevation;

Figure 3 is a vertical section taken on the line 3—3 of Figure 2, parts being again shown in elevation;

Figure 4 is a cross-section taken on the line 4—4 of Figure 2;

Figure 5 is a cross-section taken on the line 5—5 of Figure 2;

Figure 6 is a detail side elevation of enough of the vehicle chassis to illustrate the actuating means for the headlights;

Figure 7 is a perspective view of one of the posts;

Figure 8 is a front elevation illustrating a modified arrangement for simultaneously turning the headlights;

Figure 9 is a vertical section taken on the line 9—9 of Figure 8 illustrating an adjustable crank;

Figure 10 is a diagram illustrating the action of the cam mechanism when making a left turn;

Figure 11 is a diagram illustrating the action of the cam mechanism when making a right turn; and Figure 12 is a diagram illustrating in side elevation the headlight action depicted by Figure 11.

This invention is an improvement on the dirigible headlight for vehicles disclosed in Patent No. 1,569,261, granted to J. M. Calkins, January 12, 1926. This patent is devoted to certain cam disks which coact with two headlight-moving pins for the purpose of dipping or dropping the headlights upon a turn of the vehicle. The amount of dipping or dropping of the headlights is uniform and this is a feature upon which the instant invention makes an improvement.

Dirigible headlights, while a great improvement on the more familiar stationary type, do not possess the facility of adequately illuminating the inner and farther reaches of the road when the vehicle is making a turn at a curve. Neither do they have the facility of adequately illuminating the adjacent shoulder of the road at the curve. Much has been said and done toward the abolishment of the headlight glare evil, but as far as can be noticed in practice very little has been accomplished to remedy the objectionable condition.

It is a fact that a motorist can tolerate the annoyance of headlight glare as long as he can keep the near shoulder of the road in view and thus steer a straight course. It is only when the approaching glare is so dazzling that he loses sight of the near shoulder that he becomes confused, sometimes with disastrous results. Therefore, the instant invention is an improvement on the foregoing patent in particular and on dirigible headlights in general to the end that one or the other of the headlights is dipped or dropped more than its companion in making a turn of the vehicle in one or the other direction, thus to insure a full illumination of the adjacent shoulder as well as more of the middle of the road, especially on its farther reaches.

Reference is made to the drawings. Each of the right and left headlights 1 and 2, considering these from the position of the driver within the vehicle 3, has a supporting arm 4 which is pivotally connected by means of a pin 5 with the fork 6 of a lamp-actuating rod 7. The construction of each actuating rod and its accessories is alike to a certain extent, and to that extent the following description is devoted to a single device.

The actuating rod 7 is capable of limited turning in a tubular shank 8 which is suitably affixed near its lower end to a bracket 9 and is surmounted by a casing 10 which houses the improved cam mechanism. The bracket 9 consists of any one of a variety of forms, and is permanently secured at 11 to the chassis 12 of the motor vehicle. The hub or shoulder 13 which appears at the point of connection of the fork 6 with the rod 7 rides in a recess 14 in a filler 15 located in the bottom of the casing 10. The space between the filler and the rim of the casing is occupied by the cam mechanism which consists of a pair of rings 16, 17 which are separated by a spacer ring 18.

These rings, collectively known as the cam mechanism, are appropriately fixed in the casing 10. The cam mechanism includes cam surfaces which are traversed by a finger 19 which is movably connected at 20 in the fork 21 of the supporting arm 4 when the rod 7 and arm 4 are rotated to turn the respective headlights as in rounding a turn.

The cam surfaces mentioned comprise a lobe 22 and adjacent deep and shallow dwells 23 and 24 as well as conformable structures at diametrically opposite points comprising a recess 25, the crest 26 and a landing 27. As clearly indicated in Figure 5, the lobe 22 and its parts are formed on a section 28 that is separated from the spacer ring 18 to permit relative movement. The section 28 has a bore in which a stiff spring 29 or other resilient means is located, for the purpose of compensating for wear and thus maintaining a close contact with the finger 19.

The conformable cam structures alluded to are formed in both rings 16, 17 as well as the spacer ring 18. The cam lobe 22 and its adjacent dwells appear only in the section 28 which before its separation was a part of the spacer ring. A protuberance 30 on the highest part of the lobe 22 but extending over only approximately one-half the depth of the section 28 (Figure 2) coacts with a similarly formed and disposed lug 31 on one end of the finger 19. The remaining part of this end of the finger is fully rounded, as at 32 (Figure 4), the purpose of the arrangement being to produce a slight but uniform dip or pivotal swinging of the arm 4 upon the pin 5 when initially rotating the rod 7 in either direction, thus to automatically slightly deflect the light beams toward the road when instinctively steering the machine away from an approaching vehicle and obviating the possibility of dazzling the eyes of the oncoming driver.

Reverting to the fully rounded portion 32, it is the purpose of this to ride over the sides of the lobe 22 and contact the adjacent dwells 23 and 24 after the lug 31 has passed the protuberance 30. It is observed that the opposite end of the finger 19 is also fully rounded, but this rounding extends for the full depth of the finger.

The casing 10 is supplemented by a shell 33 which extends partially over the cam mechanism and terminates in an upstanding sleeve 34 over the open end of which a cover 35 extends in such a manner that there will always be a closure regardless of how far the supporting arm 4 is swung or dipped on its pivot 5. The shell has a bracket 50 suitably connected to it and this bracket is of such form that it can be applied to an adjoining fender, as clearly illustrated in Figure 1, thus supplementing the function of the bracket 9 in holding the tubular shank 8 perfectly rigid. The shell and cover coact to prevent the entrance of moisture to the internal mechanism, as well as exclude dust and dirt. In practice, the inside of the shell will be packed with grease so that proper lubrication will always be assured.

Reference is now made to both headlights and the actuating means therefor. The cam mechanisms are reversed in position in respect to the two fingers 19 to the following extent: As diagrammatically indicated in Figures 10 and 11, the deep dwells 23 are situated at near points, that is to say, adjacent to each other, while the shallow dwells 24 are situated at remote points, or, in other words, toward the outsides of the vehicle. The diametrically opposite conformable cam structures are appropriately reversed. The purpose of this reversal of the cam surfaces is to cause one headlight to swing through a greater arc or dip more on its pivot 5 than the other headlight when the headlights are rotated by the act of turning the vehicle. This turning is accomplished by a worm 36 on the steering post 37 (Figure 6)

in mesh with a quadrant 38 pivoted at 39 to the chassis. A rod 40 pivoted both to the quadrant and to an arm 41 protruding through a slot 42 in the tubular shank 8 of the headlight 2 (Figures 1 and 7) imparts rotational movement to the actuating rod 7 of that headlight when the quadrant is turned, and also to the rod 7 of the headlight 1 by virtue of a link rod 43 which at its ends is connected with arms 44 also protruding through slots in the respective tubular shanks. The rotation of the headlights thus occurs simultaneously.

As a modification in part of the foregoing arrangement, use is proposed to be made of the reach rod 45 (Figure 8) customarily found on all automobiles. The worm and quadrant with the accessories of the latter are, in this instance, not used. A crank 46 has clamp means 47 (Figure 9) by which it can be adjustably secured in any desired position whatever on the reach rod. In practice, the crank 46 can be bent into a variety of shapes so that its connection with a link 48 can be made. The ends of the link have a swivel or ball joint connection with the crank 46 and with a crank arm 49 (Figure 8) on the lower end of the actuating rod 7 of the headlight 2.

The operation is readily understood. It is first assumed that the driver of an automobile equipped with the improvements is steering a straight course along the road. At such time, the fingers 19 assume the position in Figures 4 and 5. Should the driver see an approaching vehicle he will instinctively steer his automobile to one side, perhaps ever so slight a distance. However, this is enough to cause the lugs 31 to dismount the protuberances 30, and agreeable with the purpose of these parts the supporting arms 4 and the headlights carried thereby will take a slight dip on the pivots 5, deflecting the light beams sufficiently to obviate any possibility of dazzling the eyes of the oncoming motorist. This action is automatic. It is not accomplished by the specific intention of the driver.

It is a known fact that drivers of vehicles equipped with headlights having mechanism providing for the deflection thereof in the manner stated either forget or purposely fail to make use of it under the condition mentioned. By making the action automatic, a factor of safety of no mean proportions has been contributed to this branch of the art of illumination.

Another advantage of the functions of the lugs 31 and protuberances 30 is that the elimination of the headlight glare is accomplished without reducing the intensity of the light. It is another known fact that the human eye requires some seconds to adapt itself to a change in conditions such as represented by the dimming of headlights.

Thus by dimming his headlights, the driver of an automobile may fail to perceive some object on the road, or perhaps inadvertently run too close to the oncoming car which he purposely wishes to avoid. But by causing the simultaneous and uniform dipping of both headlights 1 and 2 upon the approach of a motor car, the beams of light will merely be slightly deflected toward the road, and if anything at all, the illumination of the latter will have been improved.

Consider now a turn to the left as depicted by Figure 10. Turning of the steering wheel causes simultaneous turning of both actuating rods 7. The finger 19 of the right headlight 1 will occupy the shallow dwell 24 and the landing 27, while the finger 19 of the left headlight 2 will occupy the deep dwell 23, and the crest 26. In order to reach these positions of occupancy, the second finger must partake of a motion relatively greater than that of the first finger. The greater play which the deep dwell 23 affords the finger of the left headlight 2 will cause that headlight to dip down more than the headlight 1, so that the headlight 2 will particularly illuminate the central portions of the road while the headlight 1 will illuminate the farther reaches of the near shoulder of the road, as plainly indicated by the arrows in Figure 10.

It is unnecessary to specifically describe the action illustrated in Figure 11. It is sufficient to say that upon turning the vehicle in negotiating a right-hand curve a reverse action as concerns the headlights will take place. It is now the right headlight 1 which takes the greatest dip and the left headlight 2 which takes the lesser dip, thus respectively illuminating the near shoulder of the road as well as the farther reaches of the curve, as already brought out. These functions are again well illustrated in Figure 12, in which the illuminating action of the right and left headlights 1 and 2 is shown.

Another feature of importance is to be emphasized. The finger 19, in approaching the shallow dwell 24, will produce only a limited swinging of the respective headlights in the downward direction, after which the further turning of the headlight will be in a horizontal plane by virtue of the finger traversing the level part of the shallow dwell. But in the instance of the deep dwell 23, the finger 19 has to travel a greater distance over the lobe 22 before the bottom of the dwell 23 is reached, thus representing a deeper swinging of the respective headlight while completing its rotational movement.

While the construction and arrangements of the improved dirigible headlight is that of a generally preferred form, obviously modifications and changes may be made without departing from the spirit of the invention and the scope of the claims.

I claim:

1. In a dirigible headlight construction having a horizontally rotatable and vertically tiltable headlight supporting arm; a finger connected with said arm, a cam mechanism having a movable section with a cam surface which operates to swing the arm on its pivot as it is rotated, and resilient means pressing said section against the finger to maintain a close contact.

2. In a dirigible headlight construction having a headlight supporting arm rotatable in a horizontal plane about one axis and tiltable in a vertical plane about a different axis, and means for rotating the arm in either direction; means for producing a greater pivotal swing of the arm when rotated in one direction than when rotated in the other direction, and means for producing a slight but uniform initial pivotal swing of the arm upon said rotations.

3. In a dirigible headlight construction having a horizontally rotatable and vertically tiltable headlight supporting arm and means for rotating the arm in either direction; a finger movably connected with the arm, a variegated cam surface traversible by the finger to variously dip the arm on its pivot as the arm is rotated in opposite directions, and a protuberance embodied in a part of said cam surface from which the finger will drop to produce slight uniform dips of the arm upon initial rotation in either direction.

4. In a dirigible headlight construction having a horizontally pivoted headlight supporting arm, horizontally revoluble means for rotating the arm in one or the other direction, and a finger carried by said arm; a cam formation in one path of the finger to swing the arm upon its pivot as the arm is rotated in one direction, and a different cam formation in the other path of the finger for differently swinging the arm upon its pivot as the arm is rotated in the opposite direction.

5. In a dirigible headlight construction having a horizontally pivoted headlight supporting arm, horizontally revoluble means for rotating the arm, and a finger carried by said arm; structures paired at diametrically opposite sides of the finger to pivotally swing the arm when rotated in one direction, and differently formed structures paired at diametrically opposite sides of the finger and confronting the first paired structures to produce a greater pivotal swing of the arm when rotated in the other direction.

6. In a dirigible headlight construction having a pivoted headlight supporting arm, and means for rotating the arm in either direction; a single finger connected with said arm, and a cam over which the finger passes during rotation, having irregular lobes and dwells to actuate the finger and variably swing the arm upon its pivot upon rotation in opposite directions.

7. In a dirigible headlight construction having a rotatable and pivoted headlight supporting arm; a cam mechanism having dwells of different depths, and a single finger carried by said arm, entering the respective dwells upon rotation of said arm in opposite directions.

8. In a dirigible headlight construction having a rotatable and pivoted headlight supporting arm; a single finger movably connected with said arm, a cam lobe for one end of the finger with adjoining deep and shallow dwells, and a member having a recess for the other end of the finger with an adjoining crest and landing.

9. In a dirigible headlight construction having a pair of horizontally revoluble and vertically tiltable arms each supporting a headlight and means to simultaneously rotate the arms; a finger carried by each arm, and a pair of similar cams reversed in position respecting each finger, each cam including a cam structure operable upon the respective finger to cause one arm and consequently its headlight to dip more than the other arm and headlight on the respective pivots when rotating the arm in one direction.

10. In a dirigible headlight construction having a horizontally rotatable and vertically tiltable headlight supporting arm; a cam structure fixed relatively to the arm and comprising a pair of spaced rings with matching recesses and adjoining crests and landings, a ring situated in the space between said pair of rings, a movable section in said spacer ring having a lobe diametrically opposite to said recesses, said lobe having adjacent deep and shallow dwells, said lobe having a central protuberance, and a finger pivotally carried by said arm having one end normally occupying said recesses and the other end formed with a lug normally engaging the protuberance, and an adjoining fully rounded portion adapted to engage the lobe.

JAMES M. CALKINS.